US009519467B2

(12) United States Patent
Wang et al.

(10) Patent No.: US 9,519,467 B2
(45) Date of Patent: *Dec. 13, 2016

(54) EFFICIENT AND CONSISTENT SOFTWARE TRANSACTIONAL MEMORY

(75) Inventors: Cheng Wang, San Ramon, CA (US); Youfeng Wu, Palo Alto, CA (US); Wei-Yu Chen, Santa Clara, CA (US); Bratin Saha, Santa Clara, CA (US); Ali Reza Adl-Tabatabai, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/246,678

(22) Filed: Sep. 27, 2011

(65) Prior Publication Data
US 2012/0016853 A1    Jan. 19, 2012

Related U.S. Application Data

(63) Continuation of application No. 11/648,012, filed on Dec. 28, 2006, now Pat. No. 8,060,482.

(51) Int. Cl.
G06F 7/00          (2006.01)
G06F 17/30         (2006.01)
(Continued)

(52) U.S. Cl.
CPC .............. *G06F 8/458* (2013.01); *G06F 9/3004* (2013.01); *G06F 9/30087* (2013.01); *G06F 9/467* (2013.01)

(58) Field of Classification Search
CPC ........ G06F 9/467; G06F 8/458; G06F 9/3004; G06F 9/30087
See application file for complete search history.

(56) References Cited

U.S. PATENT DOCUMENTS 5,504,899 A    4/1996  Raz
5,511,188 A    4/1996  Pascucci et al.
(Continued)

FOREIGN PATENT DOCUMENTS

WO    00/75778 A1    12/2000

OTHER PUBLICATIONS

Colin Blundell; Unrestricted Transactional Memory; Supporting I/O and System Calls within Transactions;2006; Technical Report TR CIS-06-09; pp. 1-11.*

(Continued)

*Primary Examiner* — Mariela Reyes
*Assistant Examiner* — Jermaine Mincey
(74) *Attorney, Agent, or Firm* — Barnes & Thornburg LLP

(57) ABSTRACT

A method and apparatus for efficient and consistent validation/conflict detection in a Software Transactional Memory (STM) system is herein described. A version check barrier is inserted after a load to compare versions of loaded values before and after the load. In addition, a global timestamp (GTS) is utilized to track a latest committed transaction. Each transaction is associated with a local timestamp (LTS) initialized to the GTS value at the start of a transaction. As a transaction commits it updates the GTS to a new value and sets versions of modified locations to the new value. Pending transactions compare versions determined in read barriers to their LTS. If the version is greater than their LTS indicating another transaction has committed after the pending transaction started and initialized the LTS, then the pending transaction validates its read set to maintain efficient and consistent transactional execution.

12 Claims, 7 Drawing Sheets

(51) Int. Cl.
*G06F 9/45* (2006.01)
*G06F 9/46* (2006.01)
*G06F 9/30* (2006.01)

(56) References Cited

U.S. PATENT DOCUMENTS

| | | | |
|---|---|---|---|
| 5,715,454 A | 2/1998 | Smith | |
| 6,321,236 B1 | 11/2001 | Zollinger et al. | |
| 6,341,285 B1* | 1/2002 | Blott et al. | |
| 6,411,956 B1 | 6/2002 | Ng | |
| 6,463,427 B1 | 10/2002 | Wu | |
| 6,487,560 B1 | 11/2002 | La Rue et al. | |
| 6,553,392 B1* | 4/2003 | Mosher et al. | |
| 6,850,969 B2* | 2/2005 | Ladan-Mozes et al. | 709/213 |
| 2003/0055807 A1* | 3/2003 | Lomet | G06F 17/30353 |
| 2003/0069902 A1* | 4/2003 | Narang | G06F 17/30551 |
| 2005/0091074 A1 | 4/2005 | Feldhahn | |
| 2005/0097146 A1 | 5/2005 | Konstantinou et al. | |
| 2005/0193038 A1 | 9/2005 | Pearson et al. | |
| 2006/0085588 A1* | 4/2006 | Rajwar et al. | 711/100 |
| 2006/0085591 A1* | 4/2006 | Kumar et al. | 711/113 |
| 2006/0173885 A1* | 8/2006 | Moir et al. | 707/101 |
| 2006/0253503 A1 | 11/2006 | Barrs et al. | |
| 2006/0288053 A1 | 12/2006 | Holt et al. | |
| 2007/0073743 A1* | 3/2007 | Bammi et al. | 707/100 |
| 2007/0239915 A1* | 10/2007 | Saha et al. | 710/200 |
| 2008/0320247 A1 | 12/2008 | Morfey et al. | |

OTHER PUBLICATIONS

Naser Barghouti; Concurrency Control in Advanced Database Applications;ACM; vol. 23 No. 3; 1991; pp. 270-317.*

Office Action Received for European Patent Application No. 07 254 932.2-2221 mailed on Mar. 29, 2011, 6 pages of Office Action.

Office Action Received for Chinese Patent Application No. 200710306288.5 mailed on Jun. 26, 2009, 7 Pages of Office Action Including English Translation.

Michael F. Spear; Conflict Detection and Validation Strategies for Software Transactional Memory; 2006; Springer; pp. 180-184.

Jonathan Polley; A fine-grained Senson Network Simulator; 2004; IEEE; pp. 145-152.

Office Action Received for Chinese Patent Application No. 200710306288.5 mailed on Dec. 15, 2011, 8 Pages of Office Action Including 5 pages of English Translation.

* cited by examiner

EFFICIENT AND CONSISTENT SOFTWARE TRANSACTIONAL MEMORY

CROSS-REFERENCE TO RELATED APPLICATION

This application is a Continuation of U.S. patent application Ser. No. 11/648,012, entitled "EFFICIENT AND CONSISTENT SOFTWARE TRANSACTIONAL MEMORY" filed on Dec. 28, 2006, and is incorporated by reference herein in its entirety.

FIELD

This invention relates to the field of processor execution and, in particular, to execution of groups of instructions.

BACKGROUND

Advances in semi-conductor processing and logic design have permitted an increase in the amount of logic that may be present on integrated circuit devices. As a result, computer system configurations have evolved from a single or multiple integrated circuits in a system to multiple cores and multiple logical processors present on individual integrated circuits. A processor or integrated circuit typically comprises a single processor die, where the processor die may include any number of cores or logical processors.

The ever increasing number of cores and logical processors on integrated circuits enables more software threads to be executed. However, the increase in the number of software threads that may be executed simultaneously have created problems with synchronizing data shared among the software threads. One common solution to accessing shared data in multiple core or multiple logical processor systems comprises the use of locks to guarantee mutual exclusion across multiple accesses to shared data. However, the ever increasing ability to execute multiple software threads potentially results in false contention and a serialization of execution.

For example, consider a hash table holding shared data. With a lock system, a programmer may lock the entire hash table, allowing one thread to access the entire hash table. However, throughput and performance of other threads is potentially adversely affected, as they are unable to access any entries in the hash table, until the lock is released. Alternatively, each entry in the hash table may be locked. However, this increases programming complexity, as programmers have to account for more locks within a hash table.

Another data synchronization technique includes the use of transactional memory (TM). Often transactional execution includes speculatively executing a grouping of a plurality of micro-operations, operations, or instructions. In the example above, both threads execute within the hash table, and their accesses are monitored/tracked. If both threads access/alter the same entry, one of the transactions may be aborted to resolve the conflict. One type of transactional execution includes a Software Transactional Memory (STM), where accesses are tracked, conflict resolution, abort tasks, and other transactional tasks are performed in software.

In one implementation, versions of read operations are tracked to maintain consistency and detect conflicts. However, in a typical STM, validation of the read operations is not done until a transaction is to be committed. Therefore, if a invalidating action, such as a conflict, occurs during a transaction, some data may become inconsistent and the use of the inconsistent data may lead to program exception or infinite looping. Furthermore, execution cycles are potentially wasted in executing the rest of the transaction to discover an inconsistency occurred.

BRIEF DESCRIPTION OF THE DRAWINGS

The present invention is illustrated by way of example and not intended to be limited by the figures of the accompanying drawings.

FIG. 4b illustrates an embodiment a continued flow from FIG. 4a.

DETAILED DESCRIPTION

In the following description, numerous specific details are set forth such as examples of specific hardware support for transactional execution, specific tracking/meta-data methods, specific types of local/memory in processors, and specific types of memory accesses and locations, etc. in order to provide a thorough understanding of the present invention. It will be apparent, however, to one skilled in the art that these specific details need not be employed to practice the present invention. In other instances, well known components or methods, such as coding of transactions in software, demarcation of transactions, specific multi-core and multi-threaded processor architectures, interrupt generation/handling, cache organizations, and specific operational details of microprocessors, have not been described in detail in order to avoid unnecessarily obscuring the present invention.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. However, other representations of values in computer systems have been used. For example the decimal number 10 may also be as a binary value of 1010 and a hexadecimal letter A.

Moreover, states may be represented by values or portions of values. As an example, a locked state may be represented by a first value in a location, such as an odd number, while a version number, such as an even value, in the location represents an unlocked state. Here, a portion of the first and second value may be used to represent the states, such as two lower bits of the values, a sign bit associated with the values, or other portion of the values.

The method and apparatus described herein are for efficient and consistent validation in a software transactional memory (STM) system. Specifically, efficient and consistent validation in a software transactional memory (STM) system is primarily discussed in reference to multi-core processor computer systems. However, the methods and apparatus for efficient and consistent validation in a software transactional memory (STM) system are not so limited, as they may be implemented on or in association with any integrated circuit device or system, such as cell phones, personal digital assistants, embedded controllers, mobile platforms, desktop platforms, and server platforms, as well as in conjunction with other resources, such as hardware/software threads, that utilize transactional memory.

Figure 1:
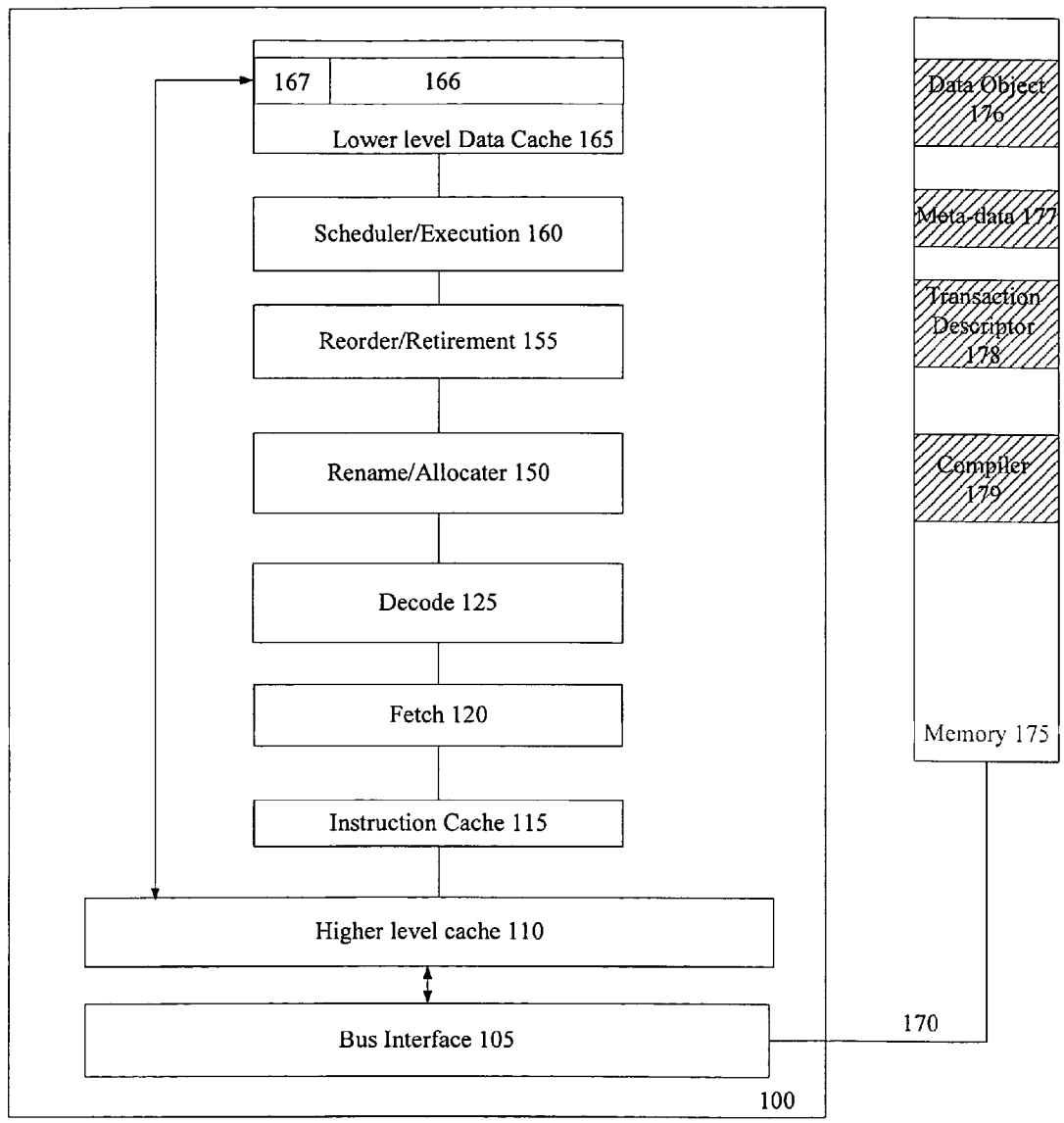
FIG. 1 illustrates an embodiment of a system capable of transactional execution.

Referring to FIG. 1, an embodiment of a processor capable of efficient and consistent validation in a software transactional memory (STM) system is illustrated. In one embodiment, processor 100 is a multi-core processor capable of executing multiple threads in parallel. However processor 100 may include any processing element, such as an embedded processor, cell-processor, microprocessor, or other known processor, which is capable of executing one thread or multiple threads. As an illustrative example, a simplified embodiment of an out-of-order architecture for a processor is illustrated in FIG. 1.

The modules shown in processor 100, which are discussed in more detail below, are potentially implemented in hardware, software, firmware, or a combination thereof. Note that the illustrated modules are logical blocks, which may physically overlap the boundaries of other modules, and may be configured or interconnected in any manner. In addition, the modules as shown in FIG. 1 are not required in processor 100. Furthermore, other modules, units, and known processor features may also be included in processor 100.

Bus interface module 105 is to communicate with a device, such as system memory 175, a chipset, a norh bridge, or other integrated circuit. Typically bus interface module 105 includes input/output (I/O) buffers to transmit and receive bus signals on interconnect 170. Examples of interconnect 170 include a Gunning Transceiver Logic (GTL) bus, a GTL+bus, a double data rate (DDR) bus, a pumped bus, a differential bus, a cache coherent bus, a point-to-point bus, a multi-drop bus or other known interconnect implementing any known bus protocol.

Processor 100 is coupled to memory 175, which may be dedicated to processor 100 or shared with other devices in a system. Examples of memory 175 includes dynamic random access memory (DRAM), static RAM (SRAM), non-volatile memory (NV memory), and long-term storage. Bus interface unit 105 as shown is also to communicate with higher level cache 110.

Higher-level cache 110 is to cache recently fetched and/or operated on elements. In one embodiment, higher-level cache 110 is a second-level data cache. However, higher level cache 110 is not so limited, as it may be or include instruction cache 115 to store recently fetched/decoded instructions. Instruction cache 115, which may also be referred to as a trace cache, is illustrated before fetch logic 120 and decode logic 125. Here, instruction cache 115 stores recently fetched instructions that have not been decoded. Yet, instruction cache 115 is potentially placed after fetch logic 120 and/or after decode logic 125 to store decoded instructions.

Fetch logic 120 is to fetch data/instructions to be operated on/executed. Although not shown, in one embodiment, fetch logic includes or is associated with branch prediction logic, a branch target buffer, and/or a prefetcher to predict branches to be executed/taken and pre-fetch instructions along a predicted branch for execution. Here, a processor capable of speculative execution potentially prefetches and speculatively executes predicted branches. Decode logic 125 is coupled to fetch logic 120 to decode fetched elements.

Allocator and renamer module 150 includes an allocator to reserve resources, such as register files to store instruction processing results and a reorder buffer to track instructions. Unit 150 may also include a register renamer to rename program/instruction reference registers to other registers internal to processor 100. Reorder/retirement module 155 includes components, such as the reorder buffers mentioned above, to support out-of-order execution and later retirement of instructions executed out-of-order. In one embodiment, where processor 100 is an in-order execution processor, re-order/retirement module 155 may not be included.

Scheduler and execution module 160, in one embodiment, includes a scheduler unit to schedule instructions/operations on execution units. Register files associated with execution units are also included to store information instruction processing results. Exemplary execution units include a floating point execution unit, an integer execution unit, a jump execution unit, a load execution unit, a store execution unit, and other known execution units.

Also shown in FIG. 1 is lower level data cache 165. Data cache 165 is to store recently used/operated on elements, such as data operands. In one embodiment, a data translation lookaside buffer (DTLB) is associated with lower level data cache 165. Often a processor logically views physical memory as a virtual memory space. As a specific example, a processor may include a page table structure to break physical memory into a plurality of virtual pages. Here, a DTLB supports translation of virtual to linear/physical addresses. Data cache 165 may be utilized as a transactional memory or other memory to track tentative accessed during execution of a transaction, as discussed in more detail below.

In one embodiment, processor 100 is a multi-core processor. A core often refers to any logic located on an integrated circuit capable of maintaining an independent architectural state, wherein each independently maintained architectural state is associated with at least some dedicated execution resources. In one embodiment, execution resources, such as execution module 160, include physically separate execution units dedicated to each core. However, execution module 160 may include execution units that are physically arranged as part of the same unit or in close proximity; yet, portions of execution module 160 are logically dedicated to each core. Furthermore, each core may share access to processor resources, such as higher level cache 110.

In another embodiment, processor 100 includes a plurality of hardware threads. A hardware thread typically refers to any logic located on an integrated circuit capable of maintaining an independent architectural state, wherein the independently maintained architectural states share access to some execution resources. For example, smaller resources, such as instruction pointers, renaming logic in rename allocater logic 150, an instruction translation buffer (ILTB) may be replicated for each hardware thread, while, resources, such as re-order buffers in reorder/retirement unit 155, load/store buffers, and queues may be shared by hardware threads through partitioning. Other resources, such as low-level data-cache and data-TLB 165, execution unit(s) 160, and parts of out-of-order unit 155 are potentially fully shared.

As can be seen, as certain processing resources are shared and others are dedicated to an architectural state, the line between the nomenclature of a hardware thread and core overlaps. Yet often, a core and a hardware thread are viewed by an operating system as individual logical processors, with each logical processor being capable of executing a thread. Logical processors may also be referred to herein as resources or processing resources. Therefore, a processor, such as processor 100, is capable of executing multiple threads on multiple logical processors/resources. Consequently, multiple transactions may be simultaneously and/or concurrently executed in processor 100.

A transaction includes a grouping of instructions, operations, or micro-operations, which may be grouped by hardware, software, firmware, or a combination thereof. For example, instructions may be used to demarcate a transaction. Typically, during execution of a transaction, updates to memory are not made globally visible until the transaction is committed. While the transaction is still pending, locations loaded from and written to within a memory are tracked. Upon successful validation of those memory locations, the transaction is committed and updates made during the transaction are made globally visible. However, if the transaction is invalidated during its pendancy, the transaction is restarted without making the updates globally visible. As a result, pendancy of a transaction, as used herein, refers to a transaction that has begun execution and has not been committed or aborted, i.e. pending. Two example systems for transactional execution include a Hardware Transactional Memory (HTM) system and a Software Transactional Memory (STM) system.

A Hardware Transactional Memory (HTM) system often refers to tracking access during execution of a transaction with processor 100 in hardware of processor 100. For example, a cache line 166 is to cache data item/object 176 in system memory 175. During execution of a transaction, annotation/attribute field 167, which is associated with cache line 166 is utilized to track accesses to and from line 166. For example, attribute field 167 includes a transaction read bit to track if cache line 166 has been read during execution of a transaction and a transaction write bit to track if cache line 166 has been written to during execution of the transaction.

Attribute field 167 is potentially used to track accesses and detect conflicts during execution of a transaction, as well as upon attempting to commit the transaction. For example, if a transaction read bit in field 167 is set to indicate a read from line 166 occurred during execution of a transaction and a store associated with line 166 from another transaction occurs, a conflict is detected. Examples of utilizing an attribute field for transactional execution is included in application with Ser. No. 11/027,623, filed on Dec. 29, 2004,And issued as U.S. Pat. No. 7,984,249 on Jul. 19, 2011entitled, "Transaction based shared data operations in a Multiprocessor Environment."

A Software Transactional Memory (STM) system often refers to performing access tracking, conflict resolution, or other transactional memory tasks in software. As a general example, compiler 179 in system memory 175, when executed by processor 100, compiles program code to insert read and write barriers into load and store operations, accordingly, which are part of transactions within the program code. Compiler 179 may also insert other transaction related operations, such as commit or abort operations.

As shown, cache 165 is still to cache data object 176, as well as meta-data 177 and transaction descriptor 178. However, meta-data location 177 is associated with data item 176 to indicate if data item 176 is locked. A read log, which may be present in transaction descriptor 178, is used to log read operations, while a write buffer or other transactional memory, which may include lower-level data cache 165, is used to buffer or log write operations. Inserted calls for validation and commit utilize the logs to detect conflicts and validate transaction operations.

Figure 2:
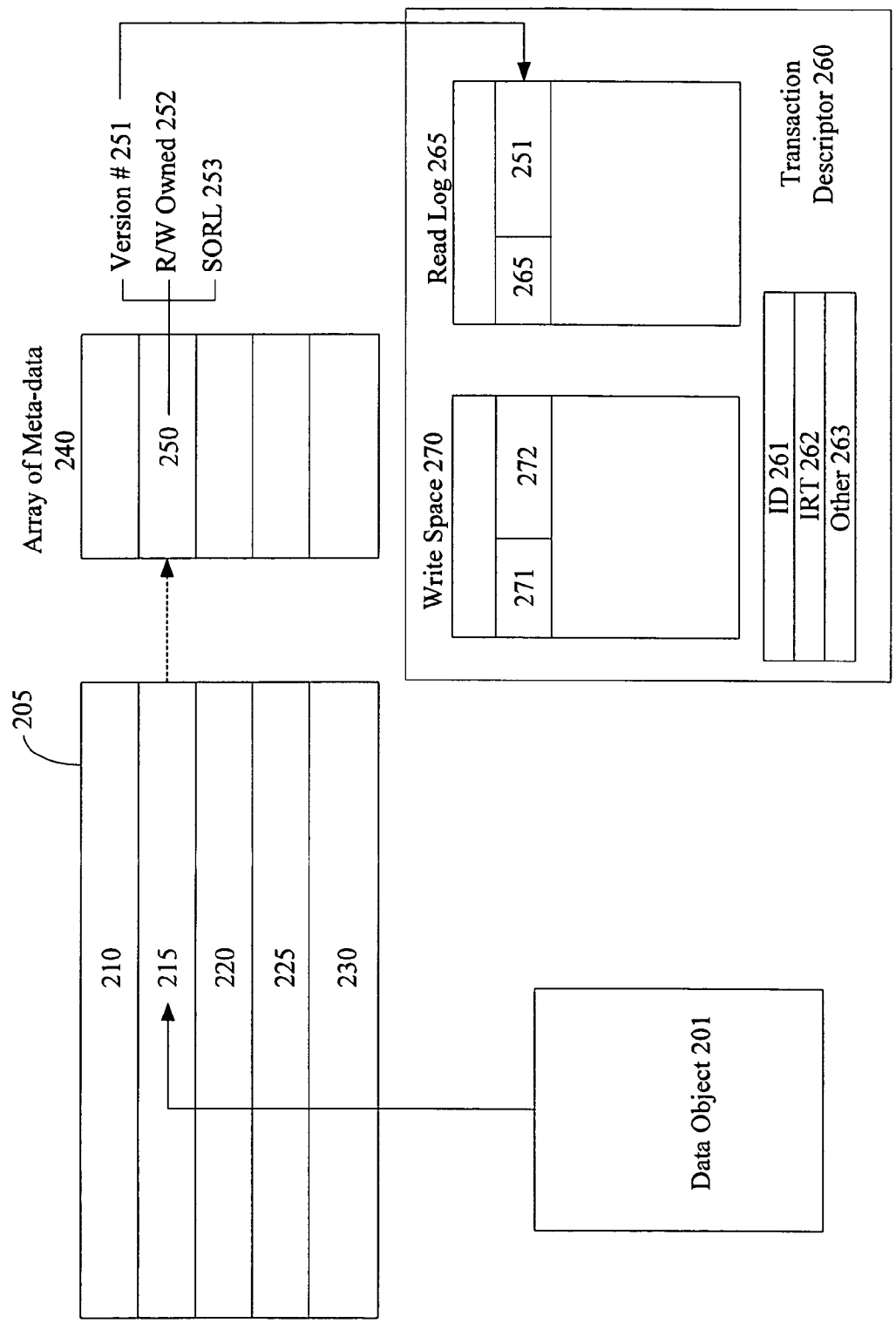
FIG. 2 illustrates an embodiment of a Software Transactional Memory (STM) system.

Referring to FIG. 2, an embodiment of a Software Transactional Memory (STM) system is illustrated. Data object 201 includes any granularity of data, such as a bit, a word, a line of memory, a cache line, a table, a hash table, or any other known data structure or object. For example, a programming language defined data object is data object 201. Transactional memory 205 includes any memory to store elements associated with transactions. Here, transactional memory 205 comprises plurality of lines 210, 215, 220, 225, and 230. In one embodiment, memory 205 is a cache memory. As an example, data object 201 is to be stored aligned in cache line 215. Alternatively, data object 201 is capable of being stored unaligned in memory 205.

In one example, each data object is associated with a meta-data location in array of meta-data 240. As an illustrative embodiment, an address associated with cache line 215 is hashed to index array 240, which associates meta-data location 250 with cache line 215 and data object 201. Note that data object 201 may be the same size of, smaller than (multiple elements per line of cache), or larger than (one element per multiple lines of cache) cache line 215. In addition, meta-data location 250 may be associated with data object 201 and/or cache line 215 in any manner.

Usually, meta-data location 250 represents whether data object 201 is locked or available. In one embodiment, when data object 201 is locked, meta data location 250 includes a first value to represent a locked state, such as read/write owned state 252. Another exemplary lock state is a Single Owner Read Lock (SORL) state, which is discussed in more detail in related application entitled, "A mechanism for Irrevocable Transactions," with Ser. No.11/648,485, filed on Dec. 28, 2006, and issued as U.S. Pat. No. 8,086,827On Dec. 27, 2011. Yet, any lock or lock state may be utilized and represented in meta-data location 250. When unlocked, or available, meta-data location 250 includes a second value. In one embodiment, the second value is to represent version number 251. Here, version number 251 is updated, such as incremented, upon a write to data object 201, to track a current version of data object 201.

As an example to illustrate operation of the embodiment shown in FIG.2, in response to a first read operation in a transaction referencing data object 201/cache line 215, the read is logged in read log 265. In one embodiment read log 265 is included in transaction descriptor 260. Transaction descriptor may also include write space 270, as well as other information associated with a transaction, such as transaction identifier (ID) 261, irrevocable transaction (IRT) indicator 262, and other transaction information. However, write space 270 and read log 265 are not required to be included in transaction descriptor 260. For example, write space 270 may be separately included in a different memory space from read log 265 and/or transaction descriptor 260. Irrevocable transactions and transaction descriptors are discussed in more detail in related application entitled, "A mechanism for Irrevocable Transactions," with Ser. No. 11,648,485, filed on Dec. 28, 2006, and issued as U.S. Pat. No. 8,086,827 on Dec. 27, 2011.

In one embodiment, logging a read includes storing version number 251 and an address associated with data object 201 or cache 215 in read log 265. Here, assume version number 251 is one to simplify the example. Upon encountering a write referencing an address associated with data object 201, the write is potentially logged or tracked as a tentative update. In addition, the meta-data location is updated to a lock value, such as two, to represent data object 201 is locked by the transaction or resource executing the transaction. In one embodiment, the lock value is updated utilizing an atomic operation, such as a read, modify, and write (RMW) instruction. Examples of RMW instructions include Bit-test and Set, Compare and Swap, and Add.

In one embodiment, write space 270 is a buffer that buffers/stores the new value to be written to data object 201. Here, in response to a commit, the new values are "written-back" to their corresponding locations, while in response to an abort the new values in write space 270 are discarded. In another embodiment, the write updates cache line 215 with a new value, and an old value 272 is stored in write space 270. Here, upon committing the transaction, the old values in the write space are discarded, and conversely, upon aborting the transaction, the old values are restored, i.e. the locations are "rolled-back" to their original values before the transaction. Examples of write space 270 include a write log, a group of check pointing registers, and a storage space to log/checkpoint values to be updated during a transaction.

More information on efficient checkpointing and roll-back for transactions is discussed in related application entitled, "Compiler Technique for Efficient Register Check-pointing to Support Transaction Roll-back," with Ser.No. 11,648,486, filed on Dec. 28, 2006, and issued as U.S. Pat. No. 7,802,136 on Sep. 21, 2010.

Continuing the example from above, whether write space 270 is utilized as a write-buffer, a write-log, or not at all, the write, when committed, releases lock 250. In one embodiment, releasing lock 250 includes returning meta-data location 250 to a value of one to represent an unlocked state. Alternatively, the value is incremented to represent unlocked version value 251 of three. This versioning allows for other transactions to validate their reads that loaded data object 201 by comparing the other transactions logged version values in their read logs to current version value 251.

The example above includes one embodiment of implementing an STM; however, any known implementation of an STM may be used. STMs are discussed in the following articles: "Implementing a High Performance Software Transactional Memory for a Multi-core Runtime" by Bratin Saha, Ali-Reza Adl-Tabatabai, Rick Hudson, Chi Cao Minh, and Ben Hertzberg, *Proceedings of the eleventh ACM SIGPLAN symposium on Principles and practice of parallel programming*; "Software Transactional Memory" by N. Shavit and D. Tuitou, *Proceedings of the Fourteenth ACM SIGACT-SIGOPS Symposium on Principles of Distributed Computing*; "Language Support for Lightweight Transactions", by T. L. Harris and K. Fraser, *Proceedings of the 2003 ACM SIGPLAN Conference on Object-Oriented Programming Systems, Languages and Applications*; and "Compiler and runtime support for efficient software transactional memory," by Ali-Reza Adl-Tabatabai, Brian Lewis, Vijay Menon, Brian Murphy, Bratin Saha, and Tatiana Shpeisman. *Proceedings of the* 2006 *ACM SIGPLAN conference on Programming language design and implementation."*

In fact, any known system for performing transactional memory may also be used, such as an HTM, an STM, an Unbounded Transactional Memory (UTM) system, a hybrid Transactional Memory system, such as a hardware accelerated STM (HASTM), or any other transactional memory system. Co-pending and related application entitled, "Hardware Acceleration of a write-buffering software transactional memory," with Ser. No. 11/784,859, filed on Apr. 9, 2007, and issued at U.S. Pat. No. 8,185,698 on May 22, 2012 discusses hardware acceleration of an STM. Application entitled, "Overflow Method or Virtualized Transactional Memory," with Ser. No. 11,479,902, filed on Jun. 30, 2006 discusses extending/virtualizing an HTM.

Previously, when version 251 is updated by a remote resource, such as a resource not executing the current transaction, updated version 251 indicates a write to line 215 by the remote resource occurred during execution of the current transaction. As a result, a previous load from line 215 in the current transaction may become invalid; yet, the invalid previous load is not detected from version 251 until an attempt to commit the current transaction when the read set of the current transaction is validated.

Therefore, in one embodiment an efficient and consistent STM capable of on demand validation includes operations to check version 251 before and after a load/read is performed. For example, when a read/load of data object 201 from line 215 in a first transaction is detected, a call to a read barrier is inserted before the load. In one embodiment, the read barrier is to check meta-data location 250. As discussed above, if meta-data 250 includes a first unlocked value in version 251, then the first unlocked version is logged in read log 265. If meta-data 250 includes a locked value, then in one embodiment, the current transaction waits until meta-data 250 is set to an unlocked value.

Now assume, the load is performed and then a remote resource updates data object 201 and modifies version 251 to a locked value and then a second unlocked value in version 251. As a result, the load has become invalid, i.e. a remote resource wrote to a location loaded by the first pending transaction, which is represented by the logged version first unlocked value being different from the current/subsequent second unlocked version value. Here, a check version barrier is also inserted after the load in the first transaction. The check version barrier is to get the current/subsequent version and compare it to the logged version in read log 265. Consequently, if the remote resource update occurs after the read and before the check version barrier is called, then the check version barrier detects the change in version 251 and is able to abort the transaction at that point instead of waiting until transaction commit to detect the invalid load in a read set logged in read log 265.

Yet, in the example above if the invalidating write by the remote resource occurs before the read or after the version check barrier, then the invalid load may potentially go undetected until an attempt at transaction commit. Therefore, in one embodiment, a global timestamp is utilized to track the versions of the latest/most recent committed transaction. As an example, a first value in the global timestamp is copied into a local timestamp for a first transaction. In this case, read barriers before loads still read version 251. In addition, version 251 is compared with the local timestamp.

If version 251 is greater than the local timestamp, the current read set of the first transaction is validated. Essentially, version 251 being greater than the local timestamp copied from the global timestamp at the start of the transaction potentially indicates another transaction or remote resource updated line 215. To illustrate, assume a global timestamp is initialized to zero. A first and second transaction start copying the zero into their local timestamps. The first transaction loads from line 215 and the second transaction writes to line 215.

Then, the second transaction commits. Here, during commit, the second transaction increments the global timestamp to one and uses the global timestamp value of one for the versions, such as version 251, associated with line 215 updated during the second transaction. Now assume the first transaction is to perform another load from line 215. When the read barrier is executed, a version of one is read from meta-data 250, which is greater then the local timestamp of the first transaction, which holds a value of zero. Therefore, the previous load in the first transaction is validated, i.e. the logged version value of zero is compared to the current version value of one. As the versions are different, indicating a conflict, the first transaction is potentially aborted at this point in the transaction.

Figure 3:
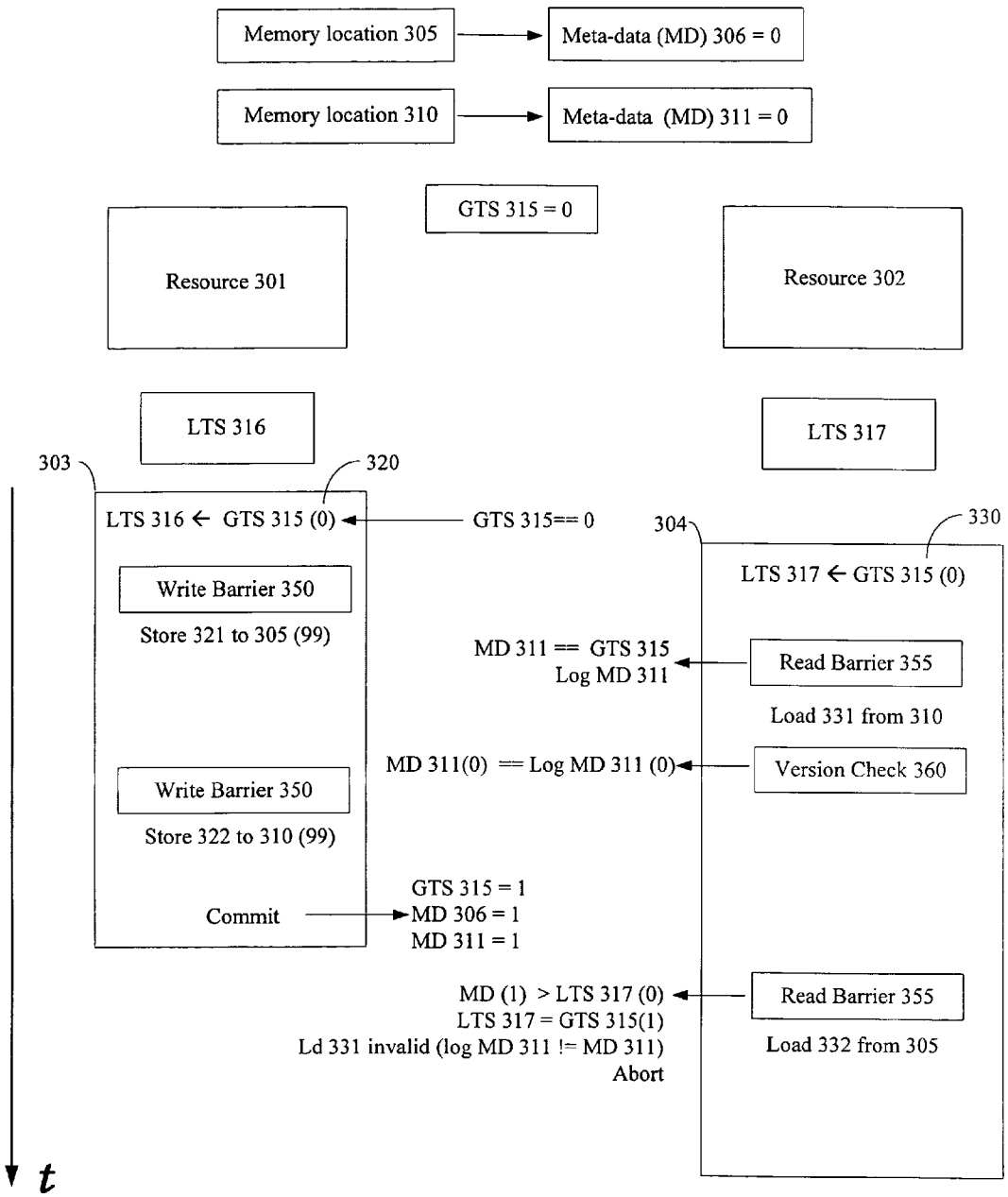
FIG. 3 illustrates an embodiment of utilizing a global timestamp in an STM to detect conflicts in an exemplary transaction.

Turning to FIG. 3, an embodiment of executing an exemplary transaction in an STM capable of utilizing inserted version check barriers and timestamps is illustrated. Here, memory location 305 and 310 are to store elements, data elements, instruction, data objects, etc. As discussed in reference to FIG. 2, memory locations 305 and 310 are associated with meta-data (MD) locations 306 and 311, respectively, in any manner. For example, memory locations 305 and 310 are cache lines to store data objects, and an address referencing the data objects or cache liens 305 and 310 are hashed to index to MD locations 306 and 311, respectively.

In addition, Global TimeStamp (GTS) 315 is to store a GTS value. In one embodiment, GTS is a variable stored in any known manner, such as on a program stack, in memory, in registers, or other storage elements. Resource 301 and 302 includes cores and/or threads, which are capable, of concurrent or simultaneous execution. For example, resources 301 and 302 may be cores on a singly physical microprocessor die to execute transaction 303 and 304, at least in part, concurrently. Local TimeStamps (LTS') 316 and 317 are variables, such as local variables initialized in transaction 303 and 304, respectively.

To illustrate the exemplary operation, at the start of execution of transaction 303, LTS 316 is loaded with GTS 315 in operation 320, to copy the initial GTS value of zero into LTS 316. Similarly, at the start of execution of transaction 304, in operation 330, GTS 315, still having a value of zero, is loaded into LTS 317, which is associated with transaction 304. First, write barrier 350, inserted before store operation 321 is to perform a write barrier operation, which includes any transaction task associated with a write/store. For example, write barrier 350 is to acquire a lock associated with a referenced location. Here, a lock for location 305 is acquired. Then, store 321 is performed. As stated above, store 321 may update location 305 and log an old value in location 305 or store 321 may buffer a new value in a write buffer and retain the old value in location 305.

Next, in transaction 304, inserted read barrier 355 is encountered before load 331 from location 310. Here, meta-data location associated with location 310 is checked. Location 310 indicates an unlocked value of zero. The unlocked value of zero is compared to LTS 317, which also has a value of zero. As LTS 317 and meta-data location 311 hold the same value of zero, no read set validation is performed and the version zero is logged as a logged version. Load 331 from location 310 is performed. After load 331, version check barrier 360 checks meta-data 311 for a second, current, or subsequent version. If the second version is different from the first version, a modification to memory location 310 has potentially occurred and transaction 304 is potentially aborted.

Here, the version at version check barrier 360 is the same as the version logged at read barrier 355, so execution of transaction 304 continues. Next, in transaction 303, write barrier 350 is encountered. A lock for location 310 is acquired. Store 322 is performed to store a value of 99 in location 310. Transaction 303 then commits. During commit, GTS 315 is incremented, such as from a value of zero to one. In a write-buffering STM, the new values are written back to locations 305 and 310. In a roll-back STM, the old logged values are discarded. In addition, incremented GTS 315 of one is utilized as the version for writes performed during transaction 303. Therefore, meta-data locations 306 and 311 are updated to a version of one, which is the value of GTS 315.

As transaction 304, is still executing on resource 302, read barrier 355 is encountered. Here, meta-data location 306 is checked, as it is associated with location 305, which is to be loaded from by operation 332. Meta-data location 306, which was updated by remote resource 301 to one, is greater than local timestamp 317 of zero. Therefore, in one embodiment, local timestamp 317 is loaded or re-loaded with the current value in GTS 315 of one.

In addition, a read set of transaction 304 is validated. Here, logged value of meta-data 311 at read barrier 355 before operation 331 is a zero and the current value of meta-data 311 is one. As a result, it is determined that load 331, i.e. the read set of transaction 304, and transaction 304 may be aborted and re-executed at this point instead of wasting execution cycles executing to an attempted commit.

Figure 4A:
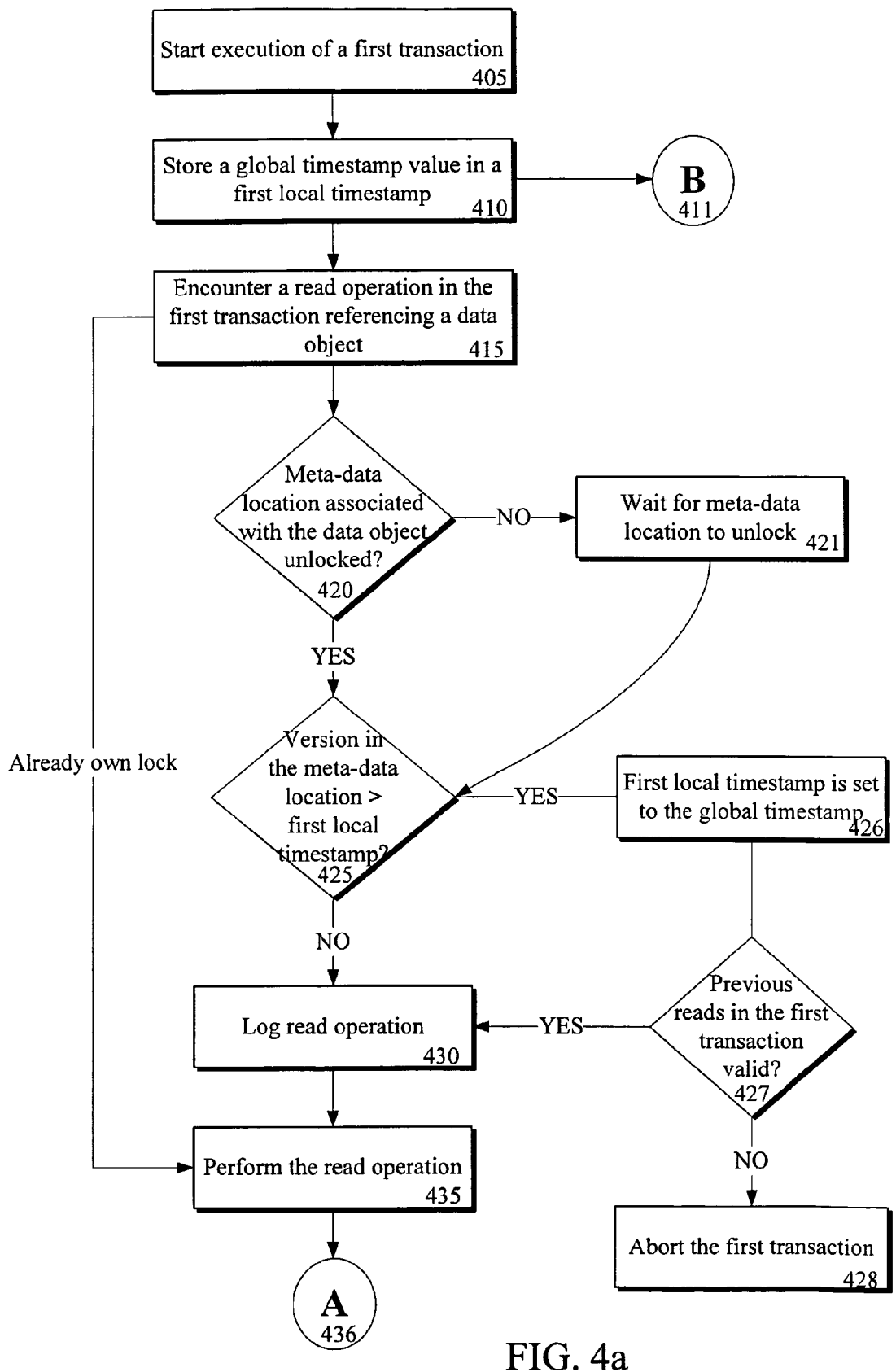
FIG. 4a illustrates an embodiment of a flow diagram for a method of efficient on demand transactional validation.

Turning to FIG. 4a, an embodiment of a flow diagram for a method of efficiently and consistently executing a transaction in an STM is illustrated. In flow 405, execution of a transaction is started. In one embodiment, a compiled start transaction instruction is executed to start execution of the transaction. As an example, a call to a start transaction function is inserted by the compiler, when executed, perform initialization and other tasks, such as the task in flow 410.

In flow 410, a first global timestamp (GTS) value is stored in a first local timestamp (LTS) associated with a first transaction, in response to starting execution of the first transaction. Examples of operations to store the first GTS in the first LTS include a copy to copy the first GTS to the first LTS, a load to read the GTS, and a store to store the first GTS in the first LTS.

Next in flow 415, a read operation, which is included in the first transaction and references a first address and/or a first data object, is encountered in the first transaction. Note that a compiler may insert a read barrier before the read operation. As a result, encountering a read operation includes encountering a read barrier associated with a read operation. As an example, a call to a read barrier function is inserted before the read operation to perform flows 420, 421, 425, 426, 427, 428, 430, and 435.

In flow 420, it is determined if the first address is unlocked. In one embodiment, a meta-data location associated with the data object/address is checked. In flow 421, if the address is not unlocked, i.e. the meta-data location represents a locked value, then execution waits in flow 421 until the address is unlocked. Here, if waiting leads to a deadlock, the transaction may be aborted.

After the address is unlocked, it is determined in flow 425 if a first version in the meta-data location is greater then the LTS. In response to the first version being greater than the LTS, the local timestamp is reloaded with a current GTS in flow 426. Furthermore, in flow 427, a plurality of previous read operations in the first transaction, such as a read set of/associated with the first transaction, are validated. If the read set is determined not to be valid in flow 427, then the first transaction is aborted in flow 428.

Whether the first version is not greater then LTS in flow 425 or it is determined that the read set is valid in flow 426, the read operation, i.e. the first/current version is logged in flow 430. Next, in flow 435, the read operation is performed. After performing the current read operation, execution flows through 436 to flow 460 in FIG. 4c. Here, a subsequent/ second version associated with the first address is checked/determined in flow 460. If the first and second version, i.e. the logged current version and the subsequent version or the version logged before the read and determined after the read, are not the same, then in flow 428 the first transaction is aborted.

Turning back to FIG. 4b, after initializing the first transaction in flows 405 and 410 from FIG. 4a, a write/store operation, which references the address or data-object may be encountered at anytime within the first transaction, as represented by the execution flow through 411 from FIG. 4a to FIG. 4b. Similar to a read/load operation, a write barrier is potentially inserted before the write operation to perform write barrier tasks, such as in flows 445 and 446. Here, in flow 445, it is determined if a lock for the address/data object is already acquired. If a lock is already acquired the write may be directly performed in flow 447. However, if not lock has been acquired, then a lock is acquired in flow 446. Note that in an alternate implementation of an STM, write locks may be acquired during commit instead of during execution of a transaction as illustrated here.

Figure 4B:
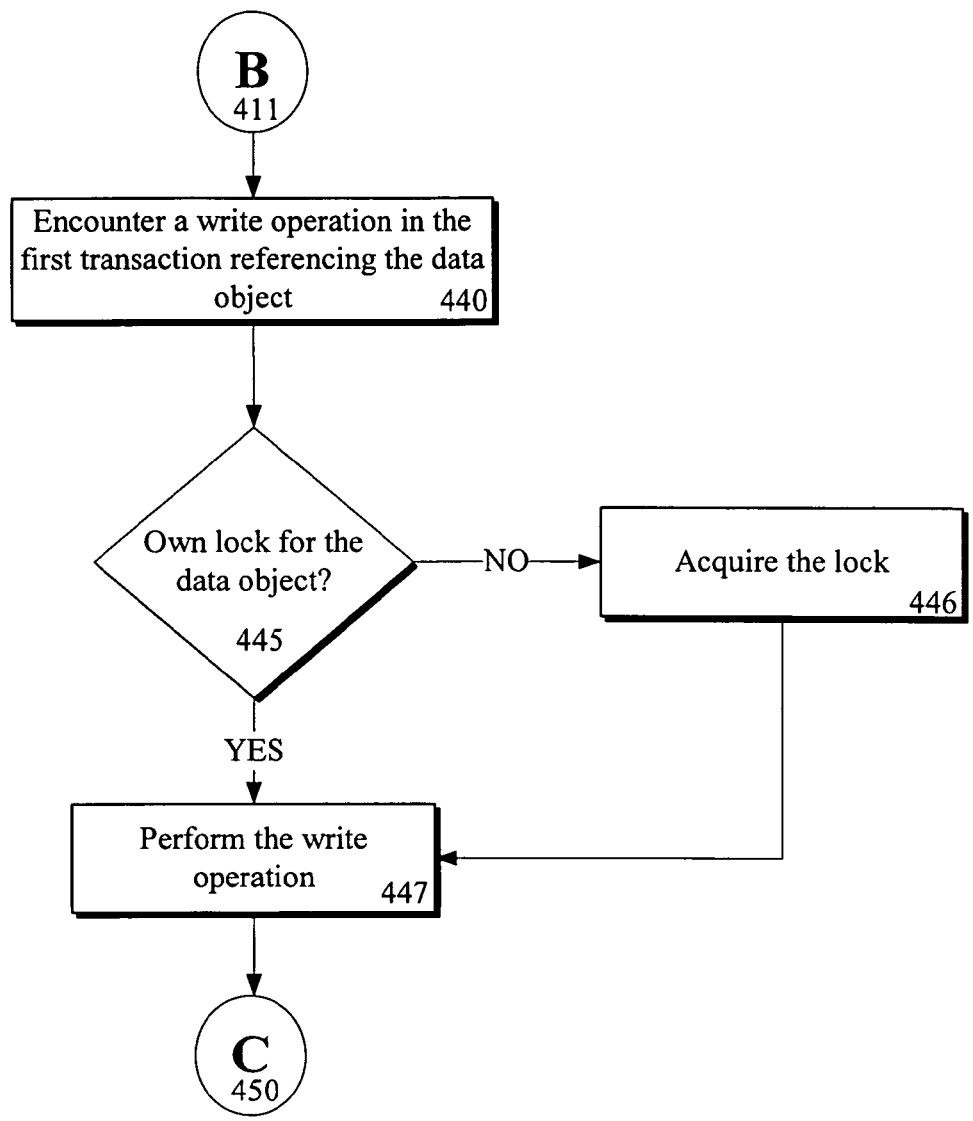
Figure 4C:
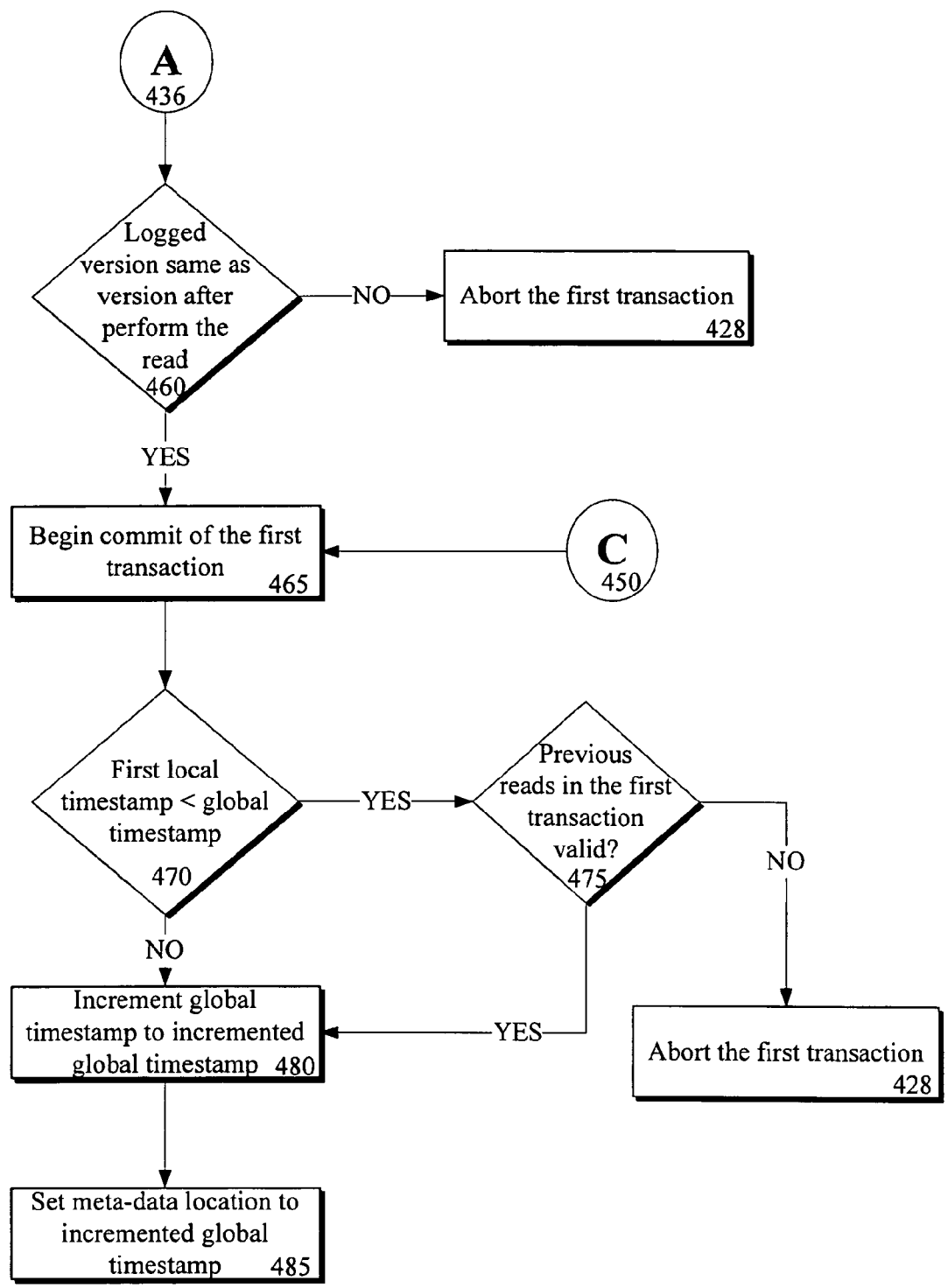
FIG. 4c illustrates an embodiment a continued flow from FIG. 4a and FIG. 4b.

Next, whether through flow 450 from FIGS. 4b to 4c, i.e. after a write operation, or after flow 460, i.e. after a read operation and version check barrier, a commit of the transaction is encountered. In one embodiment, a commit transaction instruction, such as a call to a commit function is encountered to perform commit operations, such as the tasks in flows 470, 475, 480, and 485.

In flow 470, it is determined if the LTS is less than the GTS. In response to the LTS being less than the GTS, in flow 475, each read operation in the first transaction including the plurality of previous read operations from flow 427 and the current read operation logged in flow 430 are validated. In response to the read set not being valid, the first transaction is aborted in flow 428.

However, if the read set is valid or in flow 470 the LTS is not less than the GTS, such as greater than or equal to the LTS, then in flow 480, GTS is incremented to an incremented GTS. As examples, the GTS may be incremented by any value, such as in increments of one, two, or other value. Next, in flow 485, the meta-data location is set to at least the incremented GTS value to track that the first transaction is the most recently committed transaction at that time.

Figure 5:
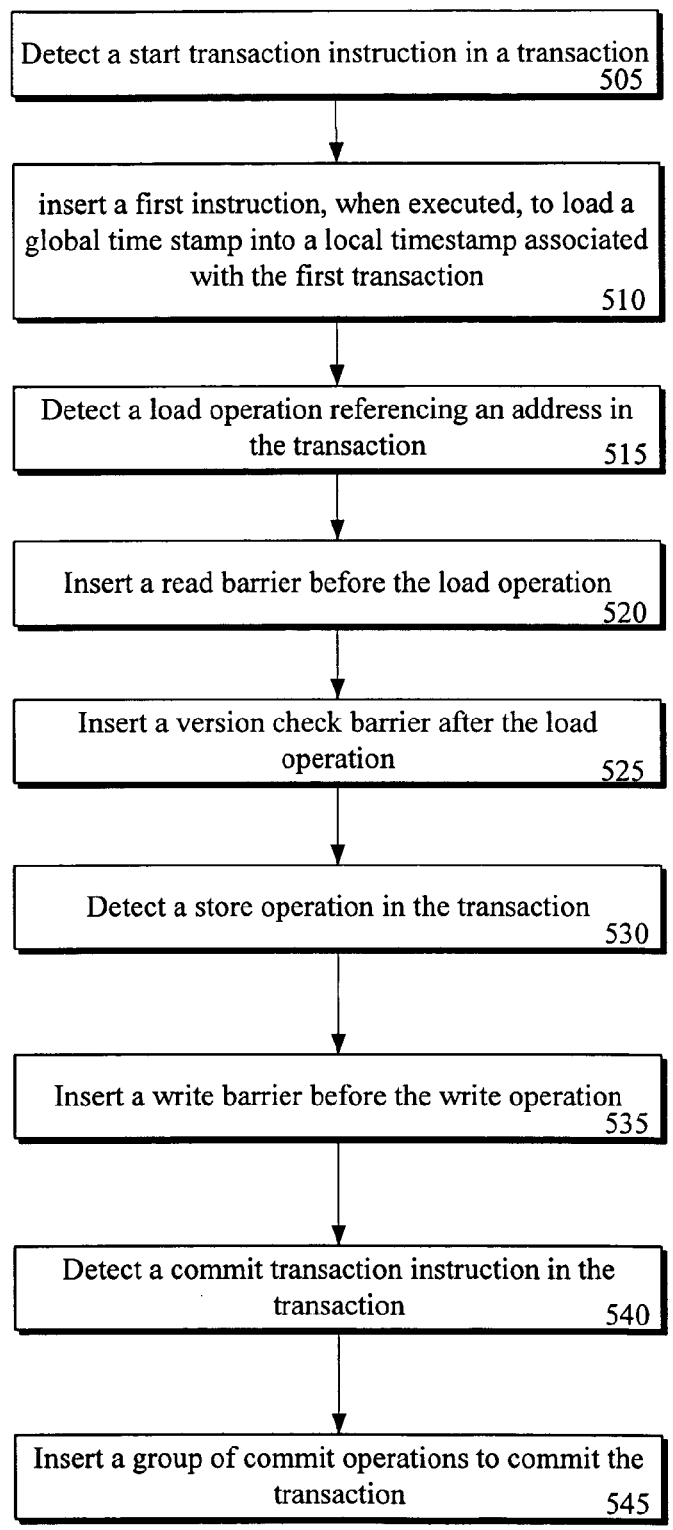
FIG. 5 illustrates an embodiment of a flow diagram for a method of inserting instructions in program code to perform efficient on demand transactional execution.

Turning to FIG. 5, an embodiment of a flow diagram for inserting operations/instructions to perform efficient and consistent validation in an STM is illustrated. In one embodiment, a compiler is executed to compile program code. During compilation instruction and/or operations are inserted.

An instruction or operation both refer to code to perform a task/operation or a group or plurality of tasks/operations. For example, often an instruction, or an operation as used herein as well, includes multiple micro-operations. For example, a compare-and-swap instruction includes multiple micro-operations to atomically compare the contents of a memory location to a given value and, if they are the same, modifies the contents of that memory location to a given new value. Therefore, the instructions and operations discussed below, when executed, may include a single or multiple operations/micro-operations to perform a single or multiple tasks/operations.

In addition, instructions/operations in program code may be detected and/or inserted in any order. For example, in FIG. 5's flow a load operation is detected in flow 515 and associated load instructions/barriers are inserted in flow 520 and 525, while a store operation is detected in flow 530 and a write barrier is inserted in flow 535. However, a write may be detected before a read. In addition, write and read barriers may be functions inserted at anytime during compilation, such as the beginning or end, and when the store or read operations are detected, calls are inserted to the functions to "insert a barrier before or after an operation."

In flow 505, a start transaction instruction is detected. In flow 510, a first instruction is inserted, when executed, to load a global time stamp (GTS) into a local timestamp (LTS) associated with the first transaction. In one embodiment, the global timestamp is to hold a most recent timestamp value of a most recent committed transaction. As an example, a call to a start transaction function is inserted and the first instruction is inserted in the start transaction function. Examples of the first instruction include a copy, a load, a store, or other operation to read a value from GTS and store the value in the LTS, such as a copy operation, when executed, to copy the GTS to the LTS.

Next, in flow 515, a load operation referencing an address in the transaction is detected. In flow 520, a read barrier is inserted before the load operation. In one embodiment, a call to a read barrier function is inserted before the load operation. In addition, at some point during compilation, compiler code, when executed, is also to insert the read barrier function. As an example, the read barrier function, when executed, is to determine a first version held in a version location, such as a meta-data location associated with the address. In addition, the read barrier is to determine if the first version is greater than the local timestamp. In response to the first version being greater than the local timestamp: the GTS, such as a current GTS, is reloaded into the LTS, a plurality of previous reads in the first transaction are validated, and the first transaction is aborted in response to one of the plurality of previous reads in the first transaction not being valid. The read barrier also logs the first version for later validation. An illustrative embodiment of pseudo code for a read barrier is illustrated below in Figure A.

```
ReadBarrier( ):
    If(OwnLock(m)) {
        v ← GetVersion( )
        goto Done:
    }
    v ← WaitOnOtherLockAndGetVersion( )
    if(v > LocalTimeStamp) {
        LocalTimeStamp ← GlobalTimeStamp
        For each Logged ( )
            ValidateVersion ( )
    }
    Log( )
Done;
```

Figure A: An illustrative embodiment of pseudo code for a read barrier

Here, the read barrier function includes a group of read barrier operations. A first read barrier operation, i.e. v←WaitOnOtherLockAndGetVersion( ), when executed, is to wait until the address is unlocked and is to obtain the current version. A second read barrier operation, i.e. if (v>LocalTimeStamp), when executed, is to determine if the current version greater than the local time stamp. In addition, a group of validation operations, such as For each Logged ( ) and ValidateVersion ( ), when executed in response to the current version being greater than the local time stamp, is to validate a plurality of previous reads in the transaction. A third read barrier operation, such as LocalTimeStamp←GlobalTimeStamp, when executed in response to the current version being greater than the local time stamp, is to copy the global time stamp to the local time stamp. Furthermore, a fourth read barrier operation, such as Log ( ), when executed, is to log the current version in a read log.

In flow 525 a call to a version check barrier after the load operation is also inserted. In one embodiment, the version check barrier includes a call to a version check function, when executed, to determine a second version held in the version location associated with the address, determine if the second version is different from the first version, and abort the first transaction, in response to the second version being different from the first version. An illustrative embodiment of pseudo code for a version check barrier function is illustrated below in Figure B.

```
ReadCheck( )
    v_new ← Abort OnOtherLockOrGetVersion(m)
    If(v != v_new)
        Abort
```

Figure B: An illustrative embodiment of pseudo code for a version check barrier function Here, the version check barrier function includes a group of version check barrier operations, when executed, to compare a subsequent version associated with the address to the current logged version. A first version check barrier operation, such as v_new←AbortOnOtherLockOrGetVersion(m), when executed, is to obtain the subsequent version corresponding to the data address if no other transaction has a lock on the address, or abort the current transaction if another transaction has a lock on the address. A second version check barrier operation, such as If(v!=v_new), when executed, is to determine if the subsequent version is different from the current version. In addition, a call to an abort function is to be executed, in response to the subsequent version being different from the current logged version, to abort the transaction.

Next, in flow 530, a store operation referencing the address in the first transaction is detected. In embodiment, a call to a write barrier function is inserted before the store operation in flow 535. As an example, the write barrier function, when executed, is to acquire a lock for the address. An illustrative embodiment of pseudo code for a write barrier function is illustrated below in Figure C. Here, a write lock is acquired for the address in response to not already owning a lock for the address. Note that a write set may also be logged, which includes a log write set pseudo code operation before Done below in Figure C. After acquiring the lock, the data is logged in the write set.

```
WriteBarrier( ):
    If(OwnLock( ))
        goto Done:
    AcquireLock( );
Done:
```

Figure C: An illustrative embodiment of pseudo code for a write barrier function In flow 540, a commit transaction instruction is detected. In one embodiment, a call to a commit function is inserted. The commit function, when executed, is to determine if the local timestamp is less than the global timestamp. In response to the local timestamp being less than the global timestamp, the commit function, when executed is to determine if a plurality of previous reads in the first transaction are valid and abort the first transaction in response to one of the plurality of previous reads in the first transaction not being valid. Furthermore, the global timestamp to be incremented to an incremented global timestamp, and the version location, i.e. the meta-data location, associated with the address is to be set to the incremented global timestamp. An illustrative embodiment of pseudo code for a commit function is illustrated below in Figure D.

```
Commit( ):
    If(LocalTimeStamp < GlobalTimeStamp) {
        For each Logged ( )
            ValidateVersion ( )
    }
    v ← ++GlobalTimeStamp;
    For each Locked m {
        SetVersion( )
        ReleaseLock ( )
    }
```

Figure D: An illustrative embodiment of pseudo code for a commit function

In this example, a first commit operation, If (LocalTimeStamp<GlobalTimeStamp), when executed, is to determine if the local time stamp is less than the global time stamp. A group of validation operations, For each Logged ( ) and For each Logged ( ), when executed in response to the local time stamp being less than the global time stamp, is to validate a plurality of previous reads in the transaction. A second commit operation, v←++GlobalTimeStamp, when executed, is to increment the global time stamp to an incremented global time stamp. Additionally, a third commit operation, SetVersion( ), when executed, is to set a most recent version associated with the address to the incremented global time stamp in response to a lock being acquired for the address during execution of the transaction. Note, in one embodiment, the transaction is a read only transaction, where the commit operation is potentially omitted.

As illustrated above, efficient and consistent validation of an STM may be performed. Previously, an invalidating access is potentially not detected until an attempt to commit the transaction. As a result, during the execution between when the invalid access commits/occurs to the attempt to commit the transaction, the inconsistent data may be used during the execution which may leads to execution exception or infinite looping. Furthermore, the execution cycle during the inconsistent execution is potentially wasted, as the transaction is to be aborted and restarted. Therefore, by inserting version check barriers after loads and utilizing timestamps, invalidating accesses/conflicts are detectable earlier, which allows a transaction to abort without extra wasted execution cycles or incurring program exception of infinite looping. In addition, spurious program errors due to the inconsistency are potentially avoided through on demand validation.

The embodiments of methods, software, firmware or code set forth above may be implemented via instructions or code stored on a machine-accessible or machine readable medium which are executable by a processing element. A machine-accessible/readable medium includes any mechanism that provides (i.e., stores and/or transmits) information in a form readable by a machine, such as a computer or electronic system. For example, a machine-accessible medium includes random-access memory (RAM), such as static RAM (SRAM) or dynamic RAM (DRAM); ROM; magnetic or optical storage medium; flash memory devices; electrical, optical, acoustical or other form of propagated signals (e.g., carrier waves, infrared signals, digital signals); etc.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the invention as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. One or more tangible machine readable storage medium storing code, which when executed, causes the machine to perform the operations of:
    maintaining a global most recent transaction timestamp to be updated in response to a commit of any transaction of a plurality of transactions;
    starting a new transaction, wherein starting the new transaction comprises copying the global most recent transaction timestamp to a first local timestamp of the new transaction;
    in response to executing a current read in the new transaction, comparing a version number of a metadata location associated with the current read to the first local timestamp to determine whether the global most recent transaction timestamp has been updated between starting the new transaction and executing the current read, wherein the global most recent transaction timestamp being updated is indicative of a transaction of the plurality of transactions having committed between starting the new transaction and executing the current read;
    executing one or more prior reads in the new transaction between starting the new transaction and executing the current read, wherein executing the one or more prior reads comprises adding a version number of a metadata location associated with each of the prior reads to a current read set of the new transaction;
    determining whether the current read set for the new transaction including the one or more prior reads executed between starting the new transaction and the current read is valid in response to determining that the global most recent transaction timestamp has been updated, wherein determining whether the current read set is valid comprises comparing each of the one or more version numbers of the current read set to a version number of the metadata location associated with the corresponding prior read;
    continuing execution of the new transaction in response to determining that the global most recent transaction timestamp has not been updated;
    continuing execution of the new transaction in response to determining that the current read set including the one or more prior reads executed from starting the new transaction to the current read is valid, wherein continuing execution of the new transaction comprises performing the current read; and
    aborting the new transaction in response to determining that the current read set including the one or more prior reads executed from starting the new transaction to the current read is not valid, wherein aborting the new transaction comprises reversing changes to memory made by the new transaction.

2. The one or more tangible machine readable storage medium of claim 1, wherein in response to executing the current read in the new transaction, determining whether the global most recent transaction timestamp has been updated between starting the new transaction and executing the current read comprises:
    determining that the global most recent transaction timestamp has been updated in response to the comparing indicating the version number of the metadata location associated with the current read is different than the first local timestamp.

3. The one or more tangible machine readable storage medium of claim 1, wherein maintaining a global most recent transaction timestamp to be updated in response to a commit of any transaction of a plurality of transactions comprises: incrementing the global most recent transaction timestamp in response to a commit of any transaction of the plurality of transactions.

4. A method comprising:
    maintaining a global most recent transaction timestamp to be updated in response to a commit of any transaction of a plurality of transactions;
    starting a new transaction, wherein starting the new transaction comprises copying the global most recent transaction timestamp to a first local timestamp of the new transaction;
    executing one or more prior reads in the new transaction in response to starting the new transaction, wherein executing the one or more prior reads comprises adding a version number of a metadata location associated with each of the prior reads to a current read set of the new transaction;
    executing a current read in the new transaction in response to executing the one or more prior reads;
    in response to executing the current read in the new transaction, comparing a version number of a metadata location associated with the current read to the first local timestamp to determine whether the global most recent transaction timestamp has been updated between starting the new transaction and executing the current read, wherein the global most recent transaction timestamp being updated is indicative of a transaction of the plurality of transactions having committed between starting the new transaction and executing the current read;
    determining whether the current read set for the new transaction including the one or more prior reads executed between starting the new transaction and the current read is valid in response to determining that the global most recent transaction timestamp has been updated, wherein determining whether the current read set is valid comprises comparing each of the one or more version numbers of the current read set to a version number of the metadata location associated with the corresponding prior read;
    continuing execution of the new transaction in response to determining that the global most recent transaction timestamp has not been updated;

continuing execution of the new transaction in response to determining that the current read set including the one or more prior reads executed from starting the new transaction to the current read is valid, wherein continuing execution of the new transaction comprises performing the current read; and aborting the new transaction in response to determining the current read set including the one or more prior reads executed from starting the new transaction to the current read is not valid, wherein aborting the new transaction comprises reversing changes to memory made by the new transaction.

5. The method of claim 4, wherein in response to executing the current read in the new transaction, determining whether the global most recent transaction timestamp has been updated between starting the new transaction and executing the current read comprises:

determining that the global most recent transaction timestamp has been updated in response to the comparing indicating the version number of the metadata location associated with the current read is different than the first local timestamp.

6. The method of claim 4, wherein maintaining a global most recent transaction timestamp to be updated in response to a commit of any transaction of a plurality of transactions comprises: incrementing the global most recent transaction timestamp in response to a commit of any transaction of the plurality of transactions.

7. A system comprising:

a processor adapted to execute code; and a memory to hold the code, the code, when executed by the processor, adapted to perform the operations of:

maintaining a global most recent transaction timestamp to be updated in response to a commit of any transaction of a plurality of transactions;

starting a new transaction, wherein starting the new transaction comprises copying the global most recent transaction timestamp to a first local timestamp of the new transaction;

in response to executing a current read in the new transaction, comparing a version number of a metadata location associated with the current read to the first local timestamp to determine whether the global most recent transaction timestamp has been updated between starting the new transaction and executing the current read, wherein the global most recent transaction timestamp being updated is indicative of a transaction of the plurality of transactions having committed between starting the new transaction and executing the current read;

executing one or more prior reads in the new transaction between starting the new transaction and executing the current read, wherein executing the one or more prior reads comprises adding a version number of a metadata location associated with each of the prior reads to a current read set of the new transaction;

determining whether the current read set for the new transaction including the one or more prior reads executed between starting the new transaction and the current read is valid in response to determining that the global most recent transaction timestamp has been updated, wherein determining whether the current read set is valid comprises comparing each of the one or more version numbers of the current read set to a version number of the metadata location associated with the corresponding prior read;

continuing execution of the new transaction in response to determining that the global most recent transaction timestamp has not been updated;

continuing execution of the new transaction in response to determining that the current read set including the one or more prior reads executed from starting the new transaction to the current read is valid, wherein continuing execution of the new transaction comprises performing the current read; and aborting the new transaction in response to determining that the current read set including the one or more prior reads executed from starting the new transaction to the current read is not valid, wherein aborting the new transaction comprises reversing changes to memory made by the new transaction.

8. The system of claim 7, wherein in response to executing the current read in the new transaction, determining whether the global most recent transaction timestamp has been updated between starting the new transaction and executing the current read comprises:

determining that the global most recent transaction timestamp has been updated in response to the comparing indicating the version number of the metadata location associated with the current read is different than the first local timestamp.

9. The system of claim 7, wherein maintaining a global most recent transaction timestamp to be updated in response to a commit of any transaction of a plurality of transactions comprises: incrementing the global most recent transaction timestamp in response to a commit of any transaction of the plurality of transactions.

10. One or more tangible machine readable storage medium storing compiler code, which when executed, causes the machine to perform the operations of: detecting a new transaction in program code and inserting code, which when executed, causes a machine to perform the operations of:

maintaining a global most recent transaction timestamp to be updated in response to a commit of any transaction of a plurality of transactions;

starting a new transaction, wherein starting the new transaction comprises copying the global most recent transaction timestamp to a first local timestamp of the new transaction;

in response to executing a current read in the new transaction, comparing a version number of a metadata location associated with the current read to the first local timestamp to determine whether the global most recent transaction timestamp has been updated between starting the new transaction and executing the current read, wherein the global most recent transaction timestamp being updated is indicative of a transaction of the plurality of transactions having committed between starting the new transaction and executing the current read;

executing one or more prior reads in the new transaction between starting the new transaction and executing the current read, wherein executing the one or more prior reads comprises adding a version number of a metadata location associated with each of the prior reads to a current read set of the new transaction;

determining whether the current read set for the new transaction including the one or more prior reads executed between starting the new transaction and the current read is valid in response to determining that the global most recent transaction timestamp has been updated, wherein determining whether the current read set is valid comprises comparing each of the one or more version numbers of the current read set to a version number of the metadata location associated with the corresponding prior read;

continuing execution of the new transaction in response to determining that the global most recent transaction timestamp has not been updated;

continuing execution of the new transaction in response to determining that the current read set including the one or more prior reads executed from starting the new transaction to the current read is valid, wherein continuing execution of the new transaction comprises performing the current read; and aborting the new transaction in response to determining that the current read set including the one or more prior reads executed from starting the new transaction to the current read is not valid, wherein aborting the new transaction comprises reversing changes to memory made by the new transaction.

11. The one or more tangible machine readable storage medium of claim 10, wherein in response to executing the current read in the new transaction, determining whether the global most recent transaction timestamp has been updated between starting the new transaction and executing the current read comprises:

determining that the version number of the metadata location associated with the current read has been updated in response to the comparing indicating the global most recent transaction timestamp is different than the first local timestamp.

12. The one or more tangible machine readable storage medium of claim 10, wherein maintaining a global most recent transaction timestamp to be updated in response to a commit of any transaction of a plurality of transactions comprises: incrementing the global most recent transaction timestamp in response to a commit of any transaction of the plurality of transactions.

* * * * *